Patented Aug. 14, 1934

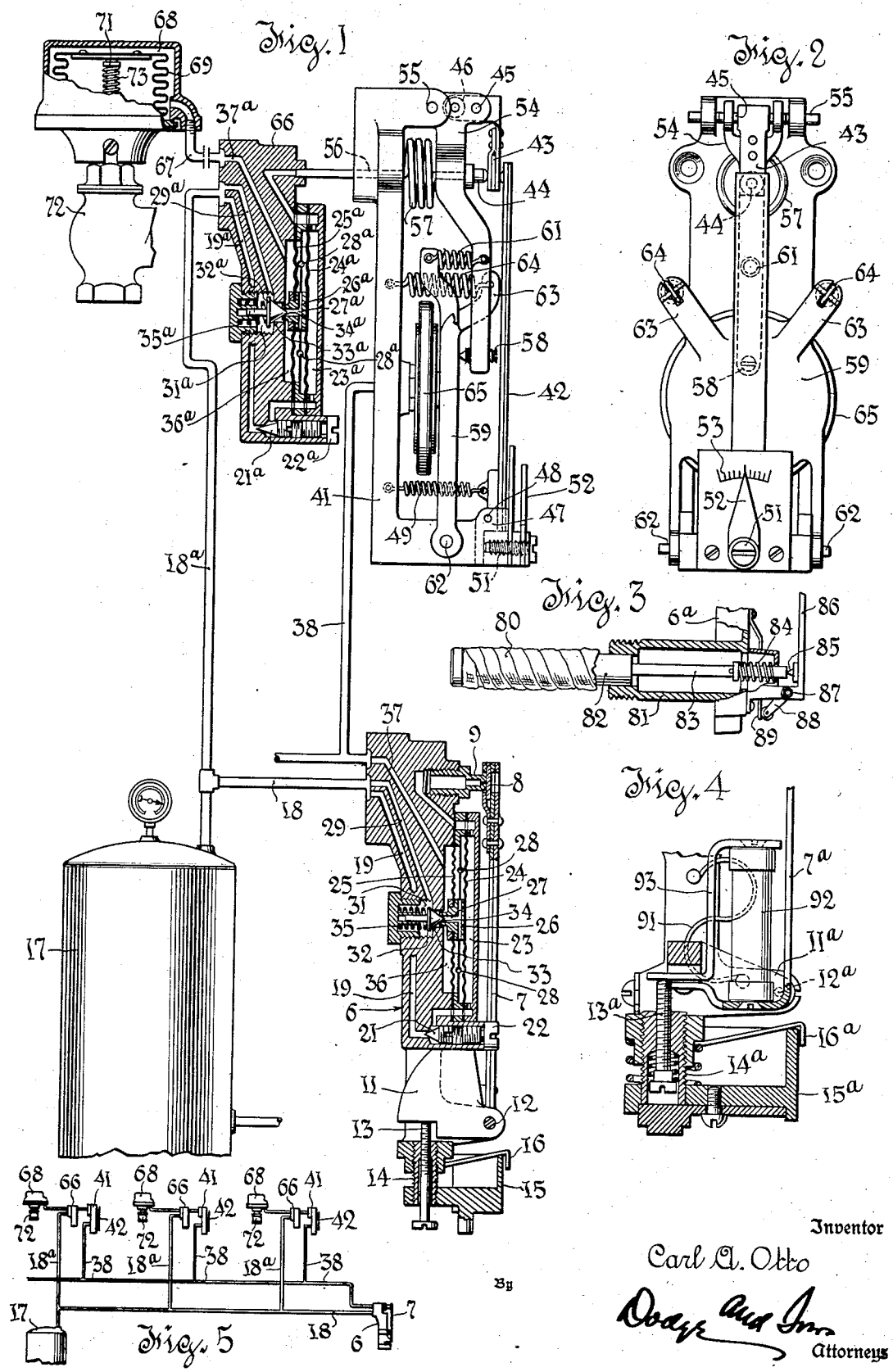

1,970,057

UNITED STATES PATENT OFFICE

1,970,057

TEMPERATURE CONTROL AND THE LIKE

Carl A. Otto, Milwaukee, Wis., assignor to Johnson Service Company, Milwaukee, Wis., a corporation of Wisconsin Application July 27, 1932, Serial No. 625,103

15 Claims. (Cl. 236—91)

This invention relates to temperature regulation and in certain aspects is directed primarily to the control of temperature in spaces which are artificially cooled, for example, theatres and auditoriums. Heretofore it has been common practice to regulate the temperature in such cooled spaces either automatically or manually to maintain a standard temperature, say 70°.

When outside temperature is high, and particularly when outside temperature and humidity are both high, the shock of entering and leaving cooled spaces of this character is considerable, and there is consequently a demand for an effective automatic control capable of modulating indoor conditions in response to outdoor conditions.

The present invention provides a simple and practical mechanism for this purpose. Perhaps the simplest embodiment is to regulate the dry bulb temperature indoors so that it is a fixed number of degrees below the outdoor dry bulb temperature.

A more refined arrangement which may be secured with the apparatus herein disclosed, involves the maintenance of indoor temperature below outdoor temperature by a number of degrees, which varies as outdoor temperature varies. For example, the indoor temperature might be only five degrees cooler than the outdoor temperature when the latter is, say, 85°, and might be ten degrees below outdoor temperature when the latter is 95°.

In cooling and conditioning the air in auditoriums it is the practice to use about 25% fresh air. The condition of the outdoor atmosphere as to humidity as well as temperature consequently enters as a factor in the operation of the plant. A still more refined embodiment of the present inventive concept contemplates the regulation of indoor temperature in response to the moisture content of outside air. A satisfactory arrangement is to modify the control of indoor dry bulb temperature in accordance with the variations of outdoor wet bulb temperature. Approximately similar results can be secured by regulating indoor dry bulb temperature in accordance with outdoor relative humidity.

Regulation according to outdoor wet bulb temperature and regulation according to outdoor relative humidity can be made to give approximately similar results, for the reason that the wet bulb depression is a function of relative humidity.

In providing an automatic control device which may be varied to regulate according to the principles above outlined, there has been developed an automatic control mechanism possessing desirable mechanical features applicable wherever such a device must respond to the combined effect of two temperatures, or to the combined effect of temperature and humidity. The two controlling temperatures may be taken at the same point or points distant from one another, and may control heating, humidifying, drying or other apparatus.

The preferred embodiments of the invention will now be described in connection with the accompanying drawing, in which,—

Fig. 1 is a view partly in elevation and partly in section, showing a single outdoor instrument (dry bulb thermostat) connected to control an indoor instrument (dry bulb thermostat).

Fig. 2 is a front elevation of the adjustable indoor thermostatic unit shown in side elevation in Fig. 1.

Fig. 3 is a view partly in elevation and partly in section, of a wet bulb thermostatic unit of the insertion type which might be substituted for either of the dry bulb units shown in Fig. 1.

Fig 4 is a view similar to Fig. 3, showing a unit responsive to relative humidity, which might be substituted for either of the dry bulb thermostatic units shown in Fig. 1.

Fig. 5 is a diagrammatic view showing how a single outdoor element is connected to control a plurality of indoor units similar to each other.

Referring first to Fig. 1, 6 represents an intermediate type dry bulb thermostat of the type described and claimed in the patent to Otto, 1,500,260, July 8, 1927. In applying the invention to the regulation of lowered temperature in buildings, the thermostat 6 is placed out of doors. The thermally responsive element, or thermostat proper, comprises a bimetallic bar 7 which carries at its upper end a valve disk 8 moved by the flexure of the bar 7 toward and from the discharge orifice in a leak port 9. To permit adjustment and to preclude overstressing of the bar 7, this is supported on a weighted saddle 11 which is pivoted at 12 in the body of the thermostatic device 6. Its position is determined by an adjustable stop comprising a screw 13 which is threaded through a stem 14. The stem 14 is also threaded in the body of the thermostat 6 and is adjusted by a swinging dial 15 which coacts with a combined detent and index 16. The user adjusts the instrument by turning the dial 15. The initial zero adjustment of the instrument may be made by the screw 13.

A compressed air reservoir 17 supplies air to the thermostat 6 through a line 18. This air flows through a passage 19 to a restricting needle valve 21 which is set to a flow capacity less than the capacity of the leak port 9. A plug 22 is provided to seal the needle valve against leakage to atmosphere. Air passing the needle valve 21 flows through a port to the chamber 23 and from the chamber 23 to the leak port 9. The thermostat 7 operates the valve 8. In the example illustrated, it tends to close it against the leak port 9 on rise of temperature, but reversal of the bar will reverse this effect.

The variable throttling of the leak port 9 serves to develop a varying pressure in the chamber 23. The rear wall of the chamber 23 is formed by a flexible diaphragm 24. This is the larger one of two diaphragms making up a differential diaphragm unit. The smaller diaphragm is shown at 25 and the two diaphragms are connected at their centers by a head 26 which is formed with a central exhaust port 27 which leads to the space between the diaphragms. The space between the diaphragms is vented to atmosphere by the ports 28. Also supplied by the pipe 18 is a second port 29 which leads to a chamber 31 surrounding a conical valve 32. The valve 32 has two seats, a supply seat 33 formed in the chamber 31, and an exhaust seat 34 formed in the head 26 and controlling exhaust flow through the port 27. The valve 32 is urged to the right by a coiled compression spring 35.

As pressure varies in the chamber 23, the diaphragms and the connected head 26 will move to the right and left. As they move to the left the valve 32 first seats on the exhaust port 34 and then is forced from its supply seat 33. It follows that as pressure varies in the chamber 23 a similar and preferably higher pressure is established in the chamber 36 at the rear of the smaller diaphragm 25. This pressure is communicated through the port 37 to the pipe 38.

The reason for using the relay is that the valve 32 can be made to supply air to the branch line 38 more rapidly than can be done without the relay. All that the leak port 9 has to do is to establish a varying pressure in the chamber 23 and the relay valve responds to supply or exhaust air to and from the pipe 38 quite rapidly. It is known practice in the art to omit the relay and to control the pressure in the pipe 38 directly by the conjoint action of the needle valve 21 and the leak port 9, and while this arrangement is inferior to that shown, it is not excluded from the scope of the present invention.

The pressure in the branch pipe 38 is used to modify the adjustment of a thermostatic unit which is subject to indoor temperature. This unit is indicated generally by the numeral 41 applied to its frame and the thermally responsive element is a bimetallic bar 42 which operates a valve 43 to control a leak port 44. The bar 42 is reversed relatively to the bar 7, that is, on rise of temperature it swings to the right, opening the leak port.

In this instance opportunity has been taken to illustrate a slightly modified form of valve 43 which is pivoted at 45 and urged in an opening direction by yielding means, in this instance, a weight 46. The thermostatic bar 42 is mounted on a saddle 47 which is pivoted at 48 and is urged by a tension spring 49 against an adjusting stop screw 51. This stop screw 51 is provided with a pointer 52 which is read against the dial 53 to indicate the adjustment. The valve 43 is illustrated as pivoted at 45 and the support for the pivot 45 is an arm 54 which is pivoted at 55 on the frame 41. The arm 54 also carries the leak port 44. To permit motion of the leak port 44 as the arm 54 swings on its pivot, the port 44 is connected to a passage 56 in the frame 41, by a large flexible coil of tubing 57.

The parts are so arranged that within the operative adjustment of the arm 54, the coil 57 is substantially unstressed. The range of movement of the arm 54 is slight and the desired result is readily attained.

At the free end of the arm 54 is an adjustable thrust screw 58 which contacts with a thrust plate 59. The arm 54 is urged toward the thrust plate 59 by a coiled tension spring 61 reacting between the two. The thrust plate 59 is forked at its lower end and pivoted at 62, 62, to the frame 41. It is provided with two splayed lugs 63 to which are attached tension springs 64 connected to the frame 41. These draw the thrust plate 59 toward the frame 41 against the resistance of a diaphragm chamber 65, to the interior of which the branch line 38 leads.

It follows from the structure so far defined that as temperature rises out of doors the pressure in the line 38 will rise. This will shift the thrust plate 59 to the right against the resistance of the spring 64 and will move the leak port 44 outward, that is, to the right relatively to Fig. 1. Since the bar 42 moves to the right on rise of temperature, the effect of a rise of temperature out of doors is to readjust the thermostatic unit 41 to maintain higher temperature indoors.

The thermostatically actuated valve 43 and the leak port 44 might be availed of in conjunction with a restricted supply of air, to maintain a variable pressure which directly actuated some controlled device, for example, a valve controlling the refrigerative effect indoors. I prefer, however, to insure a more rapid response by the use of a relay 66, which is identical with the relay described in connection with the thermostatic unit 6. This unit receives compressed air from the tank 17 through a line 18ª, and comprises the parts numbered 19ª to 37ª inclusive. These are identical with the similarly numbered parts of the thermostatic unit 6, and no separate description is necessary.

The port 37ª in which a variable pressure is maintained by the operation of the thermostatic bar 42, is connected by pipe 67 in the chamber 68 of a radiator valve motor. This motor includes a bellows diaphragm 69 which acts downwardly on the stem 71 of a valve 72 which is assumed to control the refrigerative effect of the plant. A spring 73 urges the valve in an opening direction so that the valve progressively closes and opens as the pressure in the line 67 rises and falls.

In certain types of installation refrigerative radiators are used, in which case there will be a plurality of valves such as 72. A single thermostatic unit, such as that generally indicated by the numeral 6, may be used to control the adjustment of a plurality of thermostatic units such as that generally indicated by the numeral 41. The connections for such an arrangement are indicated diagrammatically in Fig. 5.

If it is desired to control the adjustment of the indoor thermostat or thermostats 41 in response to wet bulb temperature outdoors, I substitute for the parts 7 and 11—16, inclusive, a wet bulb thermostat, as indicated in Fig. 3. In this instance the thermostat is shown as of the insertion type. A portion of the frame of the thermostatic device appears at 6ª. It has a rearward extension 81. This supports a thermostatic unit made up of a tube 82 and a thrust rod 83 which have different coefficients of expansion. The tube 82 is wrapped with gauze, shown at 80, and the gauze is kept moist by any familiar means. Consequently the thermostatic element is at the termperature of evaporating water out of doors and responds to what is called the wet bulb temperature.

The thrust of the rod 83 is resisted partly by a spring 84, whose purpose is to hold the rod 83 in engagement with the end of the tube 82. The outer end of the rod 83 reacts in thrust through the thrust bearing 85 with the lever 86. The lever 86 is pivoted at 87 to the frame 6ª and carries an arm 88 having a roller coacting with a leaf spring 89. The spring 89 tends to swing the lever 86 on its pivot so that the thrust member 85 remains in engagement with the thrust rod 83. The lever 86 carries at its upper end the valve member 8 which coacts with the leak port 9.

When organized as described in connection with Fig. 1, the tubular member 82 has the larger coefficient of expansion so that a rise of temperature produces a closing characteristic at the leak port. If the thrust member 83 had a larger coefficient the relation would be reversed.

If it is desired that the outdoor instrument 6 should respond to relative humidity, I may substitute a humidistatic element in place of the thermostat used in Fig. 1. In such case I substitute for the thermostatic bimetallic bar 7 an arm 7ª which carries the valve 8 and which is fast to the saddle 11ª pivoted at 12ª. Instead of being weighted this saddle is urged in a counterclockwise direction by an S-spring 91. Connected with the lower offset portion of arm 7ª is a member 92 which changes in length in response to changes of atmospheric humidity. Fixed to the upper end of the member 92 and projecting downward therefrom is a thrust member 93 which coacts with a stop screw 13ª. This is mounted in a threaded member 14ª which is adjusted by an arcuate dial 15ª. A combined detent and index are shown at 16ª.

Turning now to the structure illustrated in Fig. 1, the parts of the thermostatic device 6 may be so coordinated that as outdoor temperature varies there will be a definite variation of pressure in the bellows 65. The relation between such pressure and temperature can be modified by controlling the flexing characteristics of the thermostatic bar 7 and the relative areas of the diaphragms 24 and 25. It is therefore possible to establish, within reasonable limits, a desired pressure range in the motor 65. By choice of the scale of the spring 64 and the leverage relation between the thrust member 59 and the leak port 44 it is possible to secure various adjustment characteristics of the instrument 41. For example, the leak port 44 may be so shifted that the indoor temperature will be a substantially constant number of degrees, say ten degrees below outdoor temperature. In such case motion of bar 7 in response to outdoor conditions must cause leak port 44 to be moved the same distance per degree rise and in the same direction that bar 42 moves per degree rise of indoor temperature. If this relation be departed from the spread between indoor and outdoor temperature will vary. Obviously, the spread may be made to increase as temperature rises, or the reverse.

In certain cases I prefer to substitute for the dry bulb thermostat 7 of Fig. 1, the wet bulb thermostat shown in Fig. 3. In this instance, as in the case of the dry bulb thermostat it is possible to secure various results. For example, the indoor dry bulb temperature might be displaced from the outdoor wet bulb temperature by a definite number of degrees, or the spread between indoor dry bulb or outdoor wet bulb temperature might vary as the outdoor wet bulb temperature varies. On this phase of the matter the present invention is more concerned with the means to produce the result than it is with the result itself, the particular character of regulation being dependent very largely on what type of control the particular designer happens to think is best.

An important feature of the mechanism herein disclosed is the provision of a movable leak port and a movable coacting valve, each of which is controlled by means responsive to some atmospheric condition, usually temperature. Both elements might respond to the same atmospheric characteristics at different places or to different atmospheric characteristics at different places, or to different atmospheric characteristics at the same place. It is within the broad mechanical concept here involved to use any responsive element in either instrument, and as examples of responsive elements there have been disclosed in the present application a thermostat responsive to dry bulb temperature, a thermostat responsive to wet bulb temperature, and a humidistat responsive approximately to relative humidity.

From the mechanical standpoint the invention discloses a peculiarly adaptable arrangement permitting conjoint control by any two such responsive elements. The use of relays, while preferred, is not essential. The use of progressive relays is believed to offer definite advantages. Other relays are known and for certain effects might be successfully used.

What is claimed is,—

1. The combination of a regulating device; an indoor dry bulb thermostat controlling said device, said thermostat having an adjusting means to vary its response; and an outdoor wet bulb thermostat arranged to actuate said adjusting means.

2. The combination of a regulating device; an indoor dry bulb thermostat controlling said device, said thermostat having an adjusting means to vary its response; and means responsive to outdoor atmospheric humidity arranged to actuate said adjusting means.

3. The combination of a plurality of regulating devices controlling indoor conditions; a plurality of dry bulb thermostats controlling said devices and subject to indoor conditions, said thermostats each having adjusting means to vary its response; and a wet bulb thermostat, subject to outdoor conditions and connected to actuate the adjusting means of said dry bulb thermostats.

4. The combination of a plurality of regulating devices controlling indoor conditions; a plurality of dry bulb thermostats controlling said devices and subject to indoor conditions, said thermostats each having adjusting means to vary its response; and means responsive to outdoor atmospheric humidity arranged to actuate the adjusting means of said dry bulb thermostats.

5. In a regulating device the combination of a leak port element and a valve element coacting therewith each movably mounted; a thermostat arranged to move one of said elements; a pressure motor arranged to move the other of said elements; and a second thermostat arranged to control said motor from a remote point.

6. In a regulating device the combination of a leak port element and a valve element coacting therewith each movably mounted; a thermostat arranged to move one of said elements; a pressure motor arranged to move the other of said elements; and a device responsive to atmospheric condition and arranged to control said motor from a remote point.

7. In a regulating device, the combination of a leak port and a valve coacting therewith, each movably mounted; and two thermostatic means, one arranged to shift said leak port and the other arranged to shift said valve, one of said thermostats being subject to indoor temperature and the other of said thermostats being subject to outdoor temperature, and the parts being so arranged that for a given temperature variation affecting the two thermostats, each moves its connected valve or leak port, as the case may be, by the same amount and in the same direction.

8. In a regulating device, the combination of a leak port and a valve coacting therewith each movably mounted; and two thermostatic means, one subject to indoor dry bulb temperature and the other subject to outdoor wet bulb temperature, one arranged to shift said leak port and the other arranged to shift said valve.

9. In a regulating device, the combination of a leak port and a valve coacting therewith each movably mounted; and two thermostatic means, one subject to indoor dry bulb temperature and the other affected by outdoor atmospheric humidity, one arranged to shift said leak port and the other arranged to shift said valve.

10. In an automatic control device, the combination of a leak port element and a coacting valve element each shiftable relatively to the other; a thermally responsive member connected to shift one of said elements; a pressure motor provided with yielding opposing means connected to shift the other of said elements; a second leak port and coacting valve controlling the pressure in said pressure motor; and a member responsive to an atmospheric condition for controlling the coaction of the last named leak port and valve.

11. In an automatic control device, the combination of a leak port element and a coacting valve element each shiftable relatively to the other; a thermally responsive member connected to shift one of said elements; a pressure motor provided with yielding opposing means connected to shift the other of said elements; a second leak port and coacting valve controlling the pressure in said pressure motor; and a member responsive to temperature for controlling the coaction of the last named leak port and valve.

12. In an automatic control device, the combination of a leak port element and a coacting valve element each shiftable relatively to the other; a thermally responsive member connected to shift one of said elements; a pressure motor provided with yielding opposing means connected to shift the other of said elements; a second leak port and coacting valve controlling the pressure in said pressure motor; and a member responsive to wet bulb temperature for controlling the coaction of the last named leak port and valve.

13. In an automatic control device, the combination of a leak port element and a coacting valve element each shiftable relatively to the other; a thermally responsive member connected to shift one of said elements; a pressure motor provided with yielding opposing means connected to shift the other of said elements; a second leak port and coacting valve controlling the pressure in said pressure motor; and a member responsive to atmospheric humidity for controlling the coaction of the last named leak port and valve.

14. In an automatic control device, the combination of a leak port element and a coacting valve element each shiftable relatively to the other, and serving to establish a variable pressure; a progressive relay controlled thereby and serving to establish a related pressure; a control device subject to said related pressure; a thermally responsive member connected to shift one of said elements; a pressure motor with yielding opposing means connected to shift the other of said elements; a second leak port and coacting valve adapted to establish a variable pressure; a second relay controlled by said variable pressure and operative to establish a related pressure in said pressure motor; and a member responsive to atmospheric condition arranged to control the coaction of the last named leak port and valve.

15. In a regulating device, the combination of a leak port and a valve coacting therewith, each movably mounted; and two thermostatic means, one arranged to shift said leak port and the other arranged to shift said valve, one of said thermostats being subject to indoor temperature and the other to outdoor temperature, and the parts being so arranged that for a temperature variation of a given direction each moves its connected valve or leak port, as the case may be, in the same direction.

CARL A. OTTO.